US008260084B2

(12) United States Patent
Wang et al.

(10) Patent No.: US 8,260,084 B2
(45) Date of Patent: Sep. 4, 2012

(54) BINARY IMAGE STITCHING BASED ON GRAYSCALE APPROXIMATION

(75) Inventors: Xiangdong Wang, Scarborough (CA); Guoyi Fu, Toronto (CA)

(73) Assignee: Seiko Epson Corporation, Tokyo (JP)

( * ) Notice: Subject to any disclaimer, the term of this patent is extended or adjusted under 35 U.S.C. 154(b) by 883 days.

(21) Appl. No.: 12/365,947

(22) Filed: Feb. 5, 2009

(65) Prior Publication Data

US 2010/0195932 A1     Aug. 5, 2010

(51) Int. Cl.
*G06K 9/40*     (2006.01)
(52) U.S. Cl. ........ 382/284; 382/294; 382/298; 358/540; 358/450
(58) Field of Classification Search .................. 382/284, 382/294, 298; 358/540, 450
See application file for complete search history.

(56) References Cited

U.S. PATENT DOCUMENTS

| | | | | |
|---|---|---|---|---|
| 5,818,032 | A * | 10/1998 | Sun et al. | 235/494 |
| 5,832,110 | A | 11/1998 | Hull | |
| 5,859,921 | A * | 1/1999 | Suzuki | 382/118 |
| 5,999,662 | A | 12/1999 | Burt et al. | |
| 6,104,840 | A | 8/2000 | Ejiri et al. | |
| 6,154,567 | A * | 11/2000 | McGarry | 382/219 |
| 6,243,072 | B1 | 6/2001 | McKnight | |
| 6,271,847 | B1 | 8/2001 | Shum et al. | |
| 6,343,152 | B1 | 1/2002 | Chura | |
| 6,343,159 | B1 | 1/2002 | Cuciurean-Zapan et al. | |
| 6,349,153 | B1 | 2/2002 | Teo | |
| 6,359,617 | B1 | 3/2002 | Xiong | |
| 6,396,960 | B1 | 5/2002 | Yoshimura | |
| 6,424,752 | B1 | 7/2002 | Katayama et al. | |
| 6,452,686 | B1 * | 9/2002 | Svetkoff et al. | 356/602 |
| 6,522,787 | B1 | 2/2003 | Kumar et al. | |
| 6,556,691 | B1 * | 4/2003 | Lindmark | 382/100 |
| 6,683,984 | B1 * | 1/2004 | Simske et al. | 382/190 |
| 6,714,689 | B1 | 3/2004 | Yano et al. | |
| 7,231,087 | B2 * | 6/2007 | Huber | 382/222 |
| 2005/0063608 | A1 | 3/2005 | Clarke et al. | |
| 2007/0031063 | A1 | 2/2007 | Zhou | |
| 2007/0085913 | A1 | 4/2007 | Ketelaars et al. | |

OTHER PUBLICATIONS

Image and Vision Computing, Image Registration Methods: A Survey, Barbara Zitova and Jan Flusser, Department of Image Processing, Institute of Information Theory and Automation, Academy of Sciences of the Czech Republic, Jun. 26, 2003, (pp. 977-1000).
Distance Transforms of Sampled Functions, Pedro F. Felzenszwalb, The University of Chicago, Daniel P. Huttenlocher, Cornell University, Dec. 28, 2006, (pp. 1-15).
IPA—Image Processing Algorithms, Anton Berezin, Vadim Belman and Dmitry Karasik, http://www.prima.eu.org/IPA/IPA.html, Nov. 20, 2007, (pp. 1-12).

(Continued)

*Primary Examiner* — Yosef Kassa

(57) ABSTRACT

Binary image stitching based on grayscale approximation. In a first example embodiment, a method for automatic binary image stitching of first and second binary images includes several acts. First, the first and second binary images are converted into first and second thumbnail grayscale images. Each thumbnail grayscale image is a lower resolution than its corresponding binary image by a scaling factor. Next, a thumbnail transform is calculated between the first thumbnail grayscale image and the second thumbnail grayscale image. Then, a full-size transform is calculated as a function of the thumbnail transform and the scaling factor. Next, the stitched binary image is created by projecting the first binary image onto the second binary image using the full-size transform and combining overlapping portions of the first and second binary images.

20 Claims, 3 Drawing Sheets

OTHER PUBLICATIONS

An Algorithm for Image Stitching and Blending, Vladan Rankov, Rosalind J. Locke, Richard J. Edens, Paul R. Barber and Borivoj Vojnovic, Advanced Technology Development Group, Gray Cancer Institute, Mount Vernon Hospital, Northwood, Middlesex, HA6 2JR, United Kingdom, Proceedings of SPIE—vol. 5701, Mar. 2005, (pp. 190-199).

Ridge's Corner Detection and Correspondence, Erez Shilat, Michael Werman and Yoram Gdalyahu, Institute of Computer Science, The Hebrew University of Jerusalem, Jerusalem 91904, Israel, IEEE Computer Society Conference on Jun. 17-19, 1997, (pp. 1-6).

* cited by examiner

BINARY IMAGE STITCHING BASED ON GRAYSCALE APPROXIMATION

BACKGROUND

1. Technical Field

Embodiments of present invention relate to methods for image stitching. In particular, example embodiments of the present invention relate to methods for binary image stitching based on grayscale approximations of binary images.

2. Related Art

A binary image, also known as a bi-level, two-level, or bi-tonal image, is a digital image that has only two possible values for each pixel. Binary image stitching is a process of combining multiple binary images with overlapping portions to produce a single stitched image.

One common difficulty encountered in current feature-based binary image stitching methods is accurately aligning the overlapping portions of the multiple binary images. Therefore, current feature-based binary image stitching methods may result in poor quality stitched images.

SUMMARY

In general, example embodiments relate to methods for binary image stitching based on grayscale approximations of binary images.

In a first example embodiment, a method for automatic binary image stitching of first and second binary images includes several steps. The first and second binary images are converted into first and second thumbnail grayscale images. Each thumbnail grayscale image is a lower resolution than its corresponding binary image by a scaling factor. Next, a thumbnail transform is calculated between the first thumbnail grayscale image and the second thumbnail grayscale image. Then, a full-size transform is calculated as a function of the thumbnail transform and the scaling factor. Next, the stitched binary image is created by projecting the first binary image onto the second binary image using the full-size transform and combining overlapping portions of the first and second binary images. The stitched binary image can then be stored in a computer-readable medium.

In a second example embodiment, an image processing apparatus is configured to receive first and second binary images and generate a stitched binary image. The example image processing apparatus includes a grayscale conversion module, a thumbnail transform module, a full-size transform module, and a stitching module. The grayscale conversion module is configured to convert the first and second binary images into first and second thumbnail grayscale images. Each thumbnail grayscale image is a lower resolution than its corresponding binary image by a scaling factor. The thumbnail transform module is configured to calculate a thumbnail transform between the first thumbnail grayscale image and the second thumbnail grayscale image. The full-size transform module is configured to calculate a full-size transform as a function of the thumbnail transform and the scaling factor. The stitching module is configured to create a stitched binary image by projecting the first binary image onto the second binary image using the full-size transform and combining overlapping portions of the first and second binary images. The stitching module can be further configured to store the stitched binary image on a computer-readable medium.

In a third example embodiment, one or more computer-readable media have computer-readable instructions thereon which, when executed, implement the method for automatic binary image stitching discussed above in connection with the first example embodiment.

BRIEF DESCRIPTION OF THE DRAWINGS

To further develop the above and other aspects of example embodiments of the invention, a more particular description of these examples will be rendered by reference to specific embodiments thereof which are disclosed in the appended drawings. It is appreciated that these drawings depict only example embodiments of the invention and are therefore not to be considered limiting of its scope. It is also appreciated that the drawings are diagrammatic and schematic representations of example embodiments of the invention, and are not limiting of the present invention. Example embodiments of the invention will be disclosed and explained with additional specificity and detail through the use of the accompanying drawings in which.

DETAILED DESCRIPTION OF SOME EXAMPLE EMBODIMENTS

Figure 1:
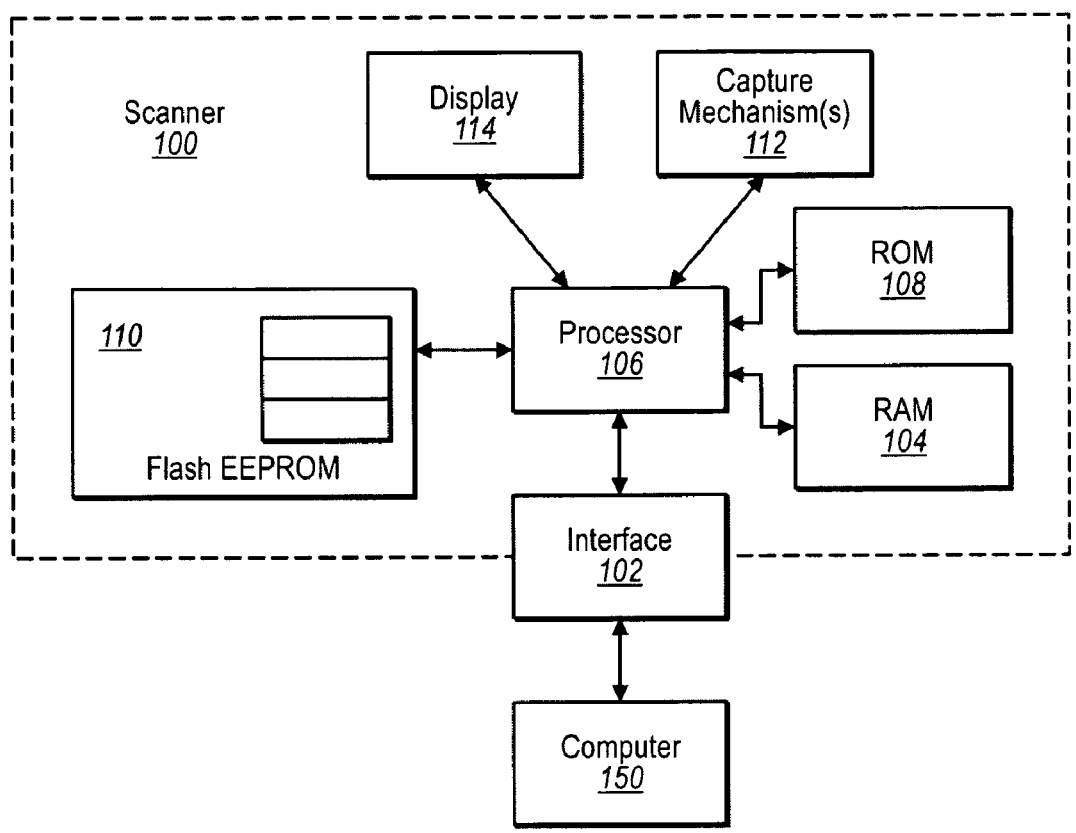
FIG. 1 is a schematic representation of an example scanner.

In general, example embodiments relate to methods for binary image stitching based on grayscale approximations of binary images. Example embodiments can be used to automatically produce a single visually pleasing stitched binary image from multiple original binary images. Example embodiments are relatively computationally efficient and simple to implement in hardware and/or software, and thus require less processing time and/or processing resources than many conventional image stitching applications.

I. Example Environment

The example methods and variations thereof disclosed herein can be implemented using computer-readable media for carrying or having computer-executable instructions or data structures stored thereon. Such computer-readable media can be any available media that can be accessed by a processor of a general purpose or special purpose computer. By way of example, and not limitation, such computer-readable media can comprise RAM, ROM, EEPROM, CD-ROM or other optical disk storage, magnetic disk storage or other magnetic storage devices, or any other medium which can be used to carry or store program code in the form of computer-executable instructions or data structures and which can be accessed by a processor of a general purpose or special purpose computer. Combinations of the above should also be included within the scope of computer-readable media.

Computer-executable instructions comprise, for example, instructions and data which cause a processor of a general purpose computer or a special purpose computer to perform a certain function or group of functions. Although the subject matter is described herein in language specific to methodological acts, it is to be understood that the subject matter defined in the appended claims is not necessarily limited to the specific acts described herein. Rather, the specific acts described herein are disclosed as example forms of implementing the claims.

Examples of special purpose computers include image processing apparatuses such as digital cameras (an example of which includes, but is not limited to, the Epson R-D1 digital camera manufactured by Seiko Epson Corporation headquartered in Owa, Suwa, Nagano, Japan), digital camcorders, projectors, printers, scanners (examples of which include, but are not limited to, the Epson Perfection© V200, V300, V500, V700, 4490, and V750-M Pro, the Epson Expression© 10000XL, and the Epson GT-1500, GT-2500, GT-15000, GT-20000, and GT-30000, all manufactured by Seiko Epson Corporation), check scanners (examples of which include, but are not limited to, the Epson CaptureOne™ Check Scanner and the Epson TM-S1000 manufactured by Seiko Epson Corporation), copiers, portable photo viewers (examples of which include, but are not limited to, the Epson P-3000 or P-5000 portable photo viewers manufactured by Seiko Epson Corporation), or portable movie players, or some combination thereof, such as a printer/scanner/copier combination (examples of which include, but are not limited to, the Epson Stylus Photo RX580, RX595, or RX680, the Epson Stylus CX4400, CX7400, CX8400, or CX9400Fax, and the Epson AcuLaser® CX11NF manufactured by Seiko Epson Corporation), printer/check scanner combination (examples of which include, but are not limited to, the Epson TM-J9000, TM-J9100, TM-J7000, TM-J7100, and TM-H6000III, all manufactured by Seiko Epson Corporation), or a digital camera/camcorder combination. An image processing apparatus may include automatic binary image stitching capability, for example, to automatically stitch together two or more binary images in order to create a single stitched binary image. For example, a scanner with this automatic binary image stitching capability may include one or more computer-readable media that implement the example methods disclosed herein, or a computer connected to the scanner may include one or more computer-readable media that implement the example methods disclosed herein.

A schematic representation of an example scanner 100 is disclosed in FIG. 1. The example scanner 100 exchanges data with a host computer 150 by way of an intervening interface 102. Application programs and a scanner driver may also be stored for access on the host computer 150. When an image retrieve command is received from the application program, for example, the scanner driver controls conversion of the command data to a format suitable for the scanner 100 and sends the converted command data to the scanner 100. The driver also receives and interprets various signals and data from the scanner 100, and provides necessary information to the user by way of the host computer 150.

When data is sent by the host computer 150, the interface 102 receives the data and stores it in a receive buffer forming part of a RAM 104. The RAM 104 can be divided into a number of sections, for example through addressing, and allocated as different buffers, such as a receive buffer or a send buffer. Data, such as digital image data, can also be obtained by the scanner 100 from the capture mechanism(s) 112. For example, the capture mechanism(s) 112 can generate a binary digital photographic image of a paper image. This digital image can then be stored in the receive buffer or the send buffer of the RAM 104.

A processor 106 uses computer-executable instructions stored on a ROM 108 or on a flash EEPROM 110, for example, to perform a certain function or group of functions, such as the example methods for binary image stitching disclosed herein. Where the data in the receive buffer of the RAM 104 is two or more binary digital images, for example, the processor 106 can implement the methodological acts on the binary digital image of the example methods for binary image stitching disclosed herein to automatically stitch together the two or more binary digital images. Further processing in an imaging pipeline may then be performed on the stitched binary digital image before the stitched binary digital image is displayed by the scanner 100 on a display 114, such as an LCD display for example, or transferred to the host computer 150, for example.

It is understood that binary digital images may be received by the scanner 100 from sources other than the computer 150 and the capture mechanism(s) 112, including, but not limited to, the flash EEPROM 110 or the ROM 108. Example embodiments of the scanner 100 include, but are not limited to, the scanner models disclosed herein.

II. Example Method

Figure 2:
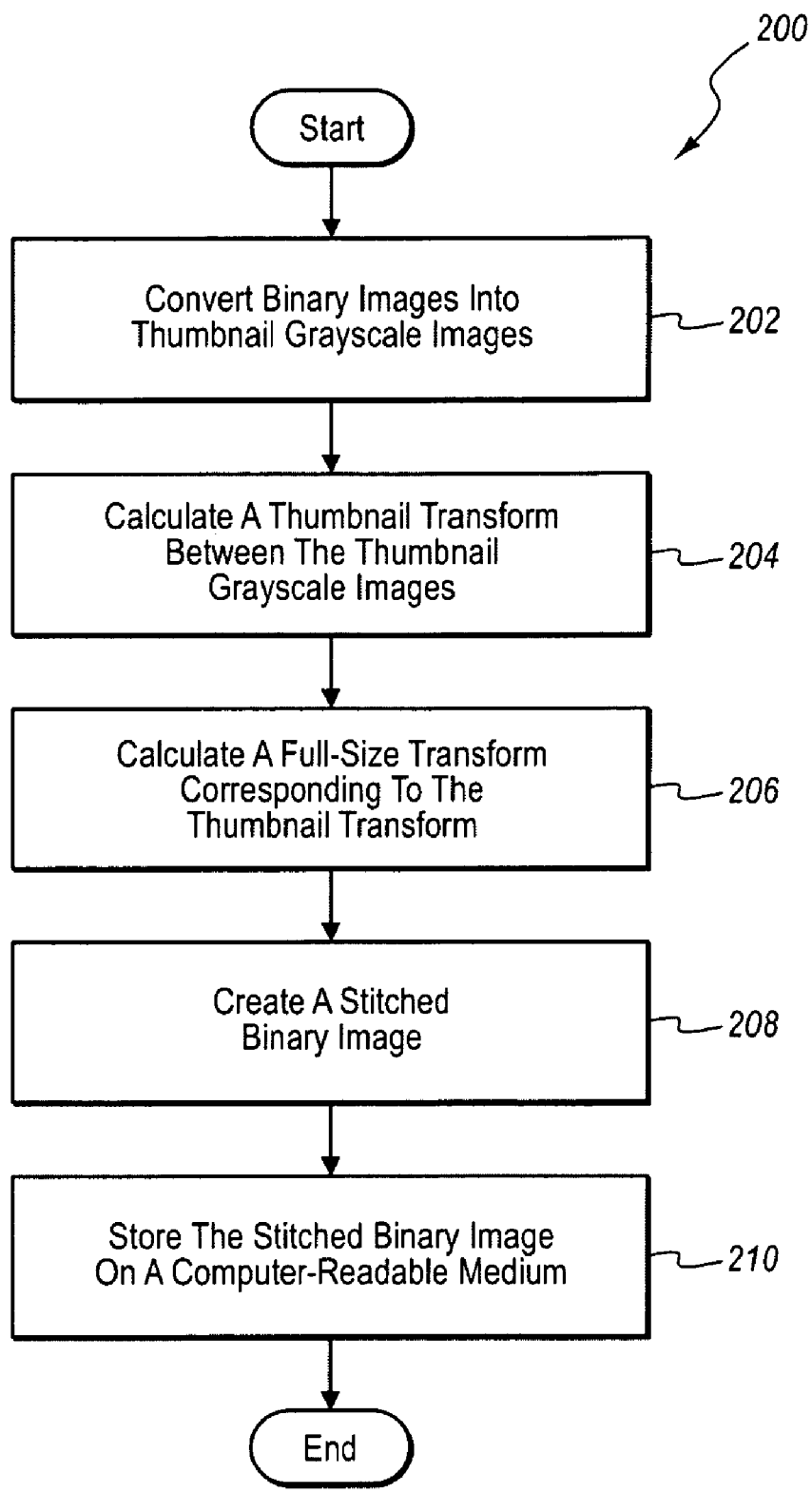
FIG. 2 is a flowchart of an example method for binary image stitching based on grayscale approximations of binary images.

FIG. 2 is a flowchart of an example method 200 for binary image stitching based on grayscale approximations of binary images. The example method 200 for automatic binary image stitching will now be discussed in connection with FIG. 2. Prior to performing the method 200, a first binary image and a second binary image can be targeted for combination through binary stitching.

At 202, the first and second binary images are converted into first and second thumbnail grayscale images. Each thumbnail grayscale image is a lower resolution than its corresponding binary image by a particular scaling factor. At 204, a thumbnail transform is calculated between the first thumbnail grayscale image and the second thumbnail grayscale image. At 206, a full-size transform corresponding to the thumbnail transform is calculated as a function of the thumbnail transform and the scaling factor. At 208, a stitched binary image is created by projecting the first binary image onto the second binary image using the full-size transform and combining overlapping portions of the first and second binary images. At 210, the stitched binary image is stored on a computer-readable medium.

III. Example Implementation of the Example Method

Figure 3:
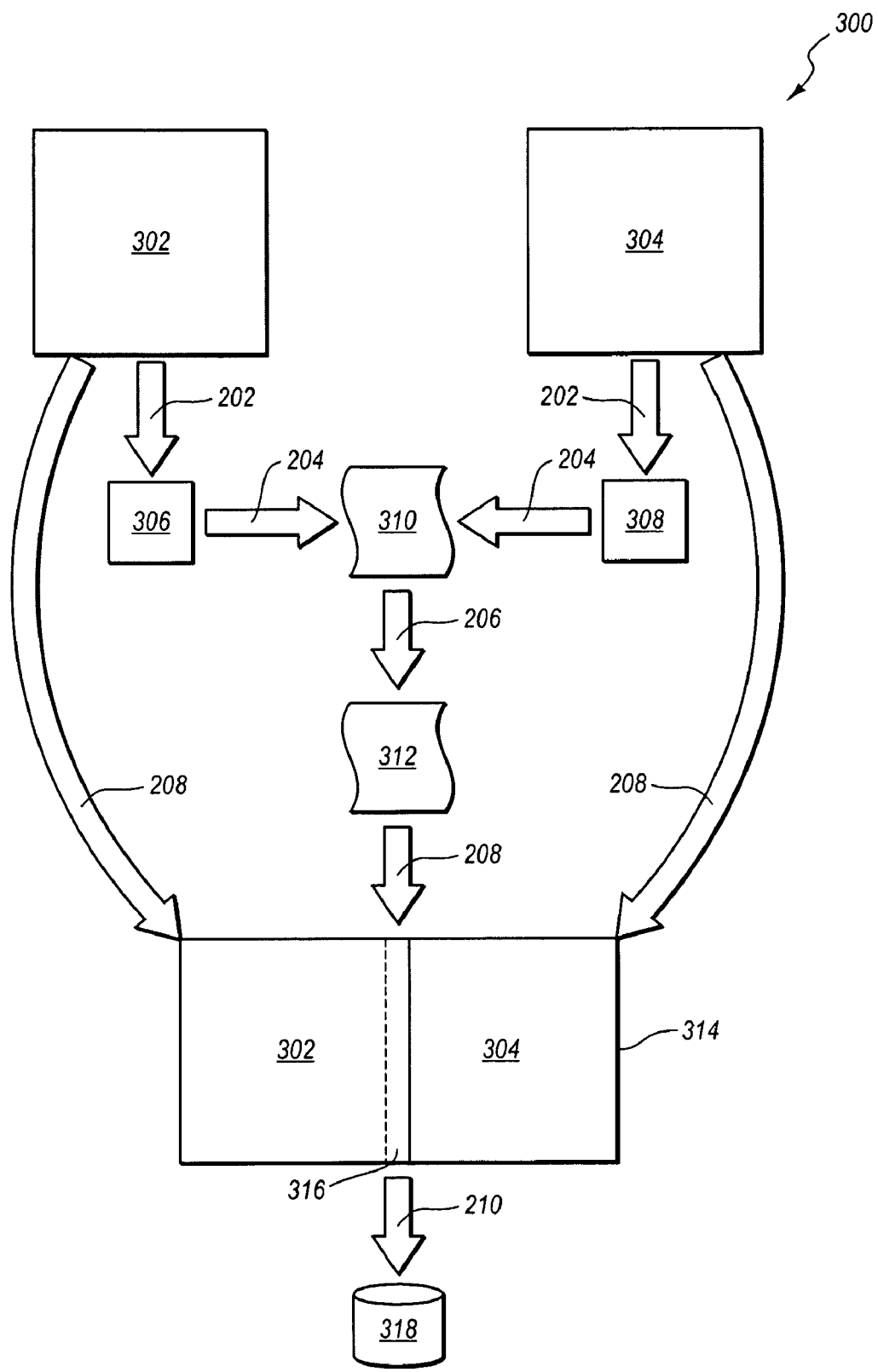
FIG. 3 is a flowchart of an example implementation of the example method of FIG. 2.

FIG. 3 is a flowchart of an example implementation 300 of the example method 200 of FIG. 2. The example implementation 300 of the example method 200 will now be disclosed in connection with FIG. 3. As disclosed in FIG. 3, the example implementation 300 receives as input a first binary image 302 and a second binary image 304 and outputs a single stitched binary image 314 that is a combination of the first and second binary images 302 and 304. In the example implementation 300, the first and second binary images 302 and 304 include black and white pixels. The black pixels are represented by a value of 0 and white pixels may are represented by a value of 255; a total of two (2) possible values. In other example implementations, the first and second binary images may include two pixel colors other than black and/or white pixels, and these two representative pixel colors may be represented by values other than 0 and 255.

With continued reference to FIGS. 2 and 3, at 202, the first and second binary images 302 and 304 are converted into first and second thumbnail grayscale images 306 and 308, respectively. As used herein, where a first image is referred to as a "thumbnail" of a second image, the term "thumbnail" indicates that the first image has a lower resolution than the second image. Thus, each of the first and second thumbnail grayscale images 306 and 308 has a lower resolution than its corresponding binary image 302 and 304, respectively. In the example implementation 300, the thumbnail grayscale images 306 and 308 are represented by values between 0 and 255; a total of two-hundred fifty-six (256) possible values. In other example implementations, the thumbnail grayscale images 306 and 308 may be represented by values in ranges other than solely between 0 and 255.

The lower resolution of the first and second thumbnail grayscale images 306 and 308 may be a function of a particular scaling factor. For example, the scaling factor may be a scaling factor k that is the smallest positive integer that satisfies at least one of the following equations:

$$W/k \leq T_w, \text{ or} \qquad \text{(Equation 1)}$$

$$H/k \leq T_h; \qquad \text{(Equation 2)}$$

where:
W is the width of the binary images,
$T_w$ is a predetermined threshold for image width,
H is the height of the binary images, and
$T_h$ is a predetermined threshold for image height.

In the example implementation 300, the predetermined threshold $T_w$ may be 100 pixels, the predetermined threshold $T_h$ may be 200 pixels, the width W of the binary images 306 and 308 may be 1000 pixels, and the height H of the binary images 306 and 308 may be 4000 pixels. In the example implementation 300, the smallest positive integer k that satisfies at least one of Equation 1 or Equation 2 is k=10.

Further, each of the first and second binary images 302 and 304 may be converted into the first and second thumbnail grayscale images 306 and 308 according to the following equation:

$$g(x, y) = \sum_{i=0}^{k-1} \sum_{j=0}^{k-1} w(i, j) \times b(x \times k + i, y \times k + j) \qquad \text{(Equation 3)}$$

where:
g(x,y) is the pixel value in y row and x column of the grayscale image,
b(i,j) is the pixel value in i row and j column of the binary image,
i≤W,
j≤H, and
w(i,j) is a predetermined weight.

Also, the predetermined weight w(i,j) may satisfy the following equation:

$$\sum_{i=0}^{k-1} \sum_{j=0}^{k-1} w(i, j) = 1. \qquad \text{(Equation 4)}$$

At 204, a thumbnail transform 310 is calculated between the first thumbnail grayscale image 306 and the second thumbnail grayscale image 308. As used herein, the term "transform" refers to a geometrical transformation that brings two or more selected images into a common co-ordinate system. For example, a transform can include the translation distance and rotation angle needed to align a first image with the co-ordinate system of a second image. In the example implementation 300, the act 204 may be accomplished, for example, using a Harris corner detector. Alternatively, the act 204 may be accomplished according to any of the various methods disclosed in United States Patent Publication Number 2005/0063608 A1, the disclosure of which is incorporated herein by reference in its entirety. Alternatively, the act 204 may be accomplished according to any of the various methods disclosed in United States Patent Publication Number 2007/0031063 A1, the disclosure of which is incorporated herein by reference in its entirety.

At 206, a full-size transform 312 is calculated as a function of the thumbnail transform 310 and the scaling factor. In the example implementation 300, the full-size transform 312 may be calculated by multiplying the translation distance of the thumbnail transform 310 by the scaling factor k=10 while the rotation angle of the thumbnail transform 310 is left unchanged. For example, the act 206 may be accomplished according to the following equations:

$$\Delta x = \Delta T_x \times k \qquad \text{(Equation 5)}$$

$$\Delta x = \Delta T_y \times k \qquad \text{(Equation 6)}$$

$$\theta = T_\theta \qquad \text{(Equation 7)}$$

where:
Δx is the full-scale translation distance in horizontal direction,
$\Delta T_x$ is the thumbnail translation distance in horizontal direction,
Δy is the full-scale translation distance in vertical direction,
$\Delta T_y$ is the thumbnail translation distance in vertical direction,
θ is the full-scale rotation angle, and
$T_\theta$ is the thumbnail rotation angle.

At 208, a stitched binary image 314 is created by projecting the first binary image 302 onto the second binary image 304 using the full-size transform 312 and combining overlapping portions 316 of the first and second binary images 302 and 304. In the example implementation 300, the act 208 may be accomplished, for example, according to any of the various methods disclosed in United States Patent Publication Number 2005/0063608 A1 or United States Patent Publication Number 2007/0031063 A1. At 210, the stitched binary image 314 is stored on a computer-readable medium 318. The computer-readable medium 318 may be any one of the various computer-readable media disclosed herein.

Although the example implementation 300 of the example method 200 results in the stitching of only two binary images into a single stitched binary image, it is understood that the example method 200 may be applied to three or more binary images resulting in the stitching of the three or more binary images into a single stitched binary image.

The example embodiments disclosed herein may be embodied in other specific forms. The example embodiments disclosed herein are to be considered in all respects only as illustrative and not restrictive.

What is claimed is:

1. A method for automatic binary image stitching of first and second binary images, the method comprising the following acts:
   a) converting the first and second binary images into first and second thumbnail grayscale images, wherein each thumbnail grayscale image is a lower resolution than its corresponding binary image by a scaling factor;
   b) calculating a thumbnail transform between the first thumbnail grayscale image and the second thumbnail grayscale image;
   c) calculating a full-size transform as a function of the thumbnail transform and the scaling factor; and
   d) creating a stitched binary image by projecting the first binary image onto the second binary image using the full-size transform and combining overlapping portions of the first and second binary images.

2. The method as recited in claim 1, wherein the scaling factor comprises a scaling factor k that is the smallest positive integer that satisfies at least one of the following equations:

$$W/k \leq T_w, \text{ or}$$

$$H/k \leq T_h;$$

where:
W is the width of the binary images;
$T_w$ is a predetermined threshold for image width;
H is the height of the binary images, and
$T_h$ is a predetermined threshold for image height.

3. The method as recited in claim 2, wherein the act a) comprises converting the first and second binary images into first and second thumbnail grayscale images according to the following equation:

$$g(x, y) = \sum_{i=0}^{k-1} \sum_{j=0}^{k-1} w(i, j) \times b(x \times k + i, y \times k + j)$$

where:
g(x,y) is the pixel value in y row and x column of the grayscale image;
b(i,j) is the pixel value in i row and j column of the binary image;
i≦W;
j≦H; and
w(i,j) is a predetermined weight.

4. The method as recited in claim 3, wherein the predetermined weight w(i,j) satisfies the following equation:

$$\sum_{i=0}^{k-1} \sum_{j=0}^{k-1} w(i, j) = 1.$$

5. The method as recited in claim 1, wherein the act b) comprises calculating a thumbnail transform between the first thumbnail grayscale image and the second thumbnail grayscale image using a Harris corner detector.

6. The method as recited in claim 1, wherein the act c) comprises calculating the full-size transform by multiplying a translation distance of the thumbnail transform by the scaling factor while a rotation angle of the thumbnail transform is left unchanged.

7. An image processing apparatus configured to receive first and second binary images and generate a stitched binary image, the image processing apparatus comprising:
a grayscale conversion module configured to convert the first and second binary images into first and second thumbnail grayscale images, wherein each thumbnail grayscale image is a lower resolution than its corresponding binary image by a scaling factor;
a thumbnail transform module configured to calculate a thumbnail transform between the first thumbnail grayscale image and the second thumbnail grayscale image;
a full-size transform module configured to calculate a full-size transform as a function of the thumbnail transform and the scaling factor; and
a stitching module configured to create a stitched binary image by projecting the first binary image onto the second binary image using the full-size transform and combining overlapping portions of the first and second binary images.

8. The apparatus as recited in claim 7, wherein the scaling factor comprises a scaling factor k that is the smallest positive integer that satisfies at least one of the following equations:

$W/k \leq T_w$, or $H/k \leq T_h$;

where:
W is the width of the binary images;
$T_w$ is a predetermined threshold for image width;
H is the height of the binary images, and
$T_h$ is a predetermined threshold for image height.

9. The apparatus as recited in claim 8, wherein the grayscale conversion module is configured to convert the first and second binary images into first and second thumbnail grayscale images according to the following equation:

$$g(x, y) = \sum_{i=0}^{k-1} \sum_{j=0}^{k-1} w(i, j) \times b(x \times k + i, y \times k + j)$$

where:
g(x,y) is the pixel value in y row and x column of the grayscale image;
b(i,j) is the pixel value in i row and j column of the binary image;
i≦W;
j≦H; and
w(i,j) is a predetermined weight.

10. The apparatus as recited in claim 9, wherein the predetermined weight w(i,j) satisfies the following equation:

$$\sum_{i=0}^{k-1} \sum_{j=0}^{k-1} w(i, j) = 1.$$

11. The apparatus as recited in claim 7, wherein the thumbnail transform module is configured to calculate a thumbnail transform between the first thumbnail grayscale image and the second thumbnail grayscale image using a Harris corner detector.

12. The apparatus as recited in claim 7, wherein the full-size transform module is configured to calculate the full-size transform by multiplying a translation distance of the thumbnail transform by the scaling factor while a rotation angle of the thumbnail transform is left unchanged.

13. The apparatus as recited in claim 7, wherein the apparatus comprises a scanner.

14. One or more non-transitory computer-readable media having computer-readable instructions thereon which, when executed, implement a method for automatic binary image stitching of first and second binary images, the method comprising the acts of:
a) converting the first and second binary images into first and second thumbnail grayscale images, wherein each thumbnail grayscale image is a lower resolution than its corresponding binary image by a scaling factor;
b) calculating a thumbnail transform between the first thumbnail grayscale image and the second thumbnail grayscale image;
c) calculating a full-size transform as a function of the thumbnail transform and the scaling factor;
d) creating a stitched binary image by projecting the first binary image onto the second binary image using the full-size transform and combining overlapping portions of the first and second binary images.

15. The one or more non-transitory computer-readable media as recited in claim 14, wherein the scaling factor comprises a scaling factor k that is the smallest positive integer that satisfies at least one of the following equations:

$W/k \leq T_w$, or $H/k \leq T_h$;

where:

W is the width of the binary images;

$T_w$ is a predetermined threshold for image width;

H is the height of the binary images, and $T_h$ is a predetermined threshold for image height.

16. The one or more non-transitory computer-readable media as recited in claim 15, wherein the act a) comprises converting the first and second binary images into first and second thumbnail grayscale images according to the following equation:

$$g(x, y) = \sum_{i=0}^{k-1}\sum_{j=0}^{k-1} w(i, j) \times b(x \times k + i, y \times k + j)$$

where:

g(x,y) is the pixel value in y row and x column of the grayscale image;

b(i,j) is the pixel value in i row and j column of the binary image;

$i \leq W$;

$j \leq H$;

w(i,j) is a predetermined weight.

17. The one or more non-transitory computer-readable media as recited in claim 16, wherein the predetermined weight w(i,j) satisfies the following equation:

$$\sum_{i=0}^{k-1}\sum_{j=0}^{k-1} w(i, j) = 1.$$

18. The one or more non-transitory computer-readable media as recited in claim 14, wherein the act b) comprises calculating a thumbnail transform between the first thumbnail grayscale image and the second thumbnail grayscale image using a Harris corner detector.

19. The one or more non-transitory computer-readable media as recited in claim 14, wherein the act c) comprises calculating the full-size transform by multiplying a translation distance of the thumbnail transform by the scaling factor while a rotation angle of the thumbnail transform is left unchanged.

20. An image processing apparatus comprising:
   a processor; and
   the one or more non-transitory computer-readable media as recited in claim 19, the processor being configured to execute the one or more computer-readable instructions.

* * * * *